United States Patent
Bradshaw et al.

(10) Patent No.: US 6,366,374 B2
(45) Date of Patent: Apr. 2, 2002

(54) AC PERFORMANCE MONITOR WITH NO CLOCK RECOVERY

(75) Inventors: Scott H. Bradshaw; David Macki, both of Ottawa (CA)

(73) Assignee: Optovation (Canada) Corp., Ottawa (CA)

(*) Notice: Subject to any disclaimer, the term of this patent is extended or adjusted under 35 U.S.C. 154(b) by 0 days.

(21) Appl. No.: 09/842,497

(22) Filed: Apr. 25, 2001

Related U.S. Application Data

(60) Provisional application No. 60/199,750, filed on Apr. 26, 2000.

(51) Int. Cl.[7] .......................... H04B 10/08; H04B 10/00
(52) U.S. Cl. ........................................ 359/110; 359/158
(58) Field of Search ................................ 359/110, 158, 359/182, 184; 356/345, 450, 351; 714/712

(56) References Cited

U.S. PATENT DOCUMENTS

| | | | | |
|---|---|---|---|---|
| 4,730,347 A | * | 3/1988 | Paul .......................... 375/118 |
| 5,774,242 A | * | 6/1998 | O'Sullivan et al. .......... 359/110 |
| 5,870,211 A | * | 2/1999 | Yoshida ....................... 359/110 |
| 5,880,837 A | * | 3/1999 | Roberts ....................... 356/345 |
| 6,188,737 B1 | * | 2/2001 | Bruce et al. ................. 375/355 |
| 6,259,543 B1 | * | 7/2001 | Golovchenko et al. ...... 359/110 |

OTHER PUBLICATIONS

Ohteru et al., "Optical Signal Quality Monitor Using Direct Q–Factor Measurement", *IEEE Photonics Technology Letters*, Oct. 1999, vol. 11, No. 10, pp. 1307–1309.

* cited by examiner

*Primary Examiner*—Leslie Pascal
*Assistant Examiner*—Dalzid Singh
(74) *Attorney, Agent, or Firm*—Freedman & Associates

(57) ABSTRACT

Apparatus and method for monitoring an optical signal using a locally generated clock signal instead of a clock signal recovered from the optical signal. Numerous eye diagrams are generated based on a ratio between the known local clock and numerous estimates of the bit rate of the optical signal. The best eye diagram is selected, and the actual bit rate of the optical signal is then determined. Given the actual bit rate, time-varying performance of the optical signal may be monitored.

4 Claims, 2 Drawing Sheets

AC PERFORMANCE MONITOR WITH NO CLOCK RECOVERY

CROSS-REFERENCE TO RELATED APPLICATIONS

The present application claims priority to provisional Application No. 60/199,750 filed Apr. 26, 2000, which is incorporated herein by reference.

BACKGROUND OF THE INVENTION

The present invention relates generally to fiber optic systems, and more particularly to performance monitors that measure timing-dependent characteristics of the fiber optic signal being monitored.

With increasing demand for telecommunications bandwidth, there has arisen a need for performance monitors that assess the quality of an optical signal at an intermediate or an end point of an optical link. This information may be used during link construction in order to aid in troubleshooting, or while the link is functioning in order to aid in dynamic allocation of optical bandwidth. For example, this information is useful in locating a fault in a link or determining when a signal needs to be regenerated.

The optical signal is typically monitored by tapping a fraction of the optical power from the optical signal channel and converting the tapped optical signal into an electrical signal using a photodiode or other suitable optical-to-electrical conversion device. The actual monitoring circuitry is electrical. The electrical signal that represents the optical power in the optical signal is sometimes referred to informally as the optical signal.

Complete signal monitoring includes both timing-independent (DC) information such as signal power level, noise floor level (signal-to-noise ratio (SNR)), and wavelength drift from the International Telecommunications Union (ITU) grid specified wavelength, as well as timing-dependent (AC) information such as jitter, signal extinction ratio (the ratio of the optical power in a logical "1" to the optical power in a logical "0"), and bit error ratio (BER).

One approach is described in S. Ohteru and N. Takachio, "Optical Signal Quality Monitor Using Direct Q-Factor Measurement", IEEE-PTL vol. 11 no. 10 at 1307–1309 (1999). This article describes a method of deriving the standard deviation and the mean value of the marks/spaces rail of an eye pattern (diagram) and calculates the Q-factor.

In a traditional receiver, an incoming optical signal is split into first and second signals, and a clock signal is recovered from the first signal. The phase of the recovered clock signal is adjusted to the center of the bit, and the recovered clock signal is used to sample the second signal. A decision circuit determines whether the sampled voltage level corresponds to a logical 1 or 0. The quality of the optical signal can be visually determined by using an oscilloscope, triggered by the recovered clock signal. An oscilloscope trace of the measured optical power for an extended random pattern of logical 0's and 1's is referred to as an eye diagram, so-called because it looks like an eye. The eye diagram provides a visual indication as to whether 0's and 1's are being adequately differentiated so that the transitions can be adequately detected.

An ideal eye diagram has an open central area bounded by four features. The central area is bounded on the top by a trace of the 1 signal level and on the bottom by a trace of the 0 signal level. On the left, the central area is bounded by a trace of the signal transitioning from 0 to 1 and by a trace of the signal transitioning from 1 to 0. On the right, the central area is bounded by a trace of the signal transitioning from 1 to 0 and by a trace of the signal transitioning from 0 to 1. For real-world signals, factors such as overshoot, rise time and fall time will distort the symmetry of the eye diagram. A high-quality signal exhibits a "clean" or "open" eye, with the samples being close together and forming well-defined traces in the eye diagram. A low-quality signal exhibits a "closed" eye, with the samples infringing into the central part of the eye.

A traditional signal monitor may use an analog-to-digital converter (ADC) in place of the decision circuit for digitally monitoring the quality of the optical signal. (Such a monitor is similar to a digital oscilloscope.) However, the bit rate of typical optical signals is in the gigabit-per-second range, and conventional electronic circuitry is not fast enough to take a large number (say 100) of samples of each bit. Instead, the signal is sampled (by clocking the ADC) at a much slower rate (at various points relative to the clock edge) and the sample values are stored in memory. By using a phase adjustment circuit to adjust the phase of the sampling clock between one edge of the bit and the other, a complete sample of the incoming waveform is constructed over time. The samples extracted by the performance monitor may be graphed to form an eye diagram.

The accurate recovery of the clock information from the optical signal is important; without an accurately recovered clock, it is not known whether a given sample occurs at the midpoint of the eye or near the edge.

Without the recovered clock, it is possible to determine the AC statistics of the 1's and 0's of the eye; however, this can be translated into eye quality only in the case of well-behaved signals. In the real world, signals are not well-behaved. A good eye and a bad eye can both have the same AC statistics for the ones and zeros. Thus, for real-world signals, eye quality complete with phase information is an important concern.

There is a therefore a need to economically provide full AC quality monitoring information.

SUMMARY OF THE INVENTION

In order to overcome the above-noted deficiencies, an AC performance monitoring device and method uses a locally-generated clock instead of recovering the clock from the optical signal. A number of samples are extracted from the optical signal at a timing determined by the locally-generated clock, and are placed in an eye diagram. Numerous eye diagrams are generated using various estimates of the clock rate of the optical signal (i.e., the bit rate). The actual bit rate of the optical signal corresponds to the estimated bit rate having the best eye diagram.

One advantage of the present invention is that the full data stream does not need to be regenerated in order to extract the monitoring information. Rather, the bit rate of the optical signal is determined over many bit times without having to recover the clock signal. This relaxes the need for real-time signal processing.

A further understanding of the nature and advantages of the present invention may be realized by reference to the remaining portions of the specification and the drawings.

DESCRIPTION OF SPECIFIC EMBODIMENTS

Figure 1:
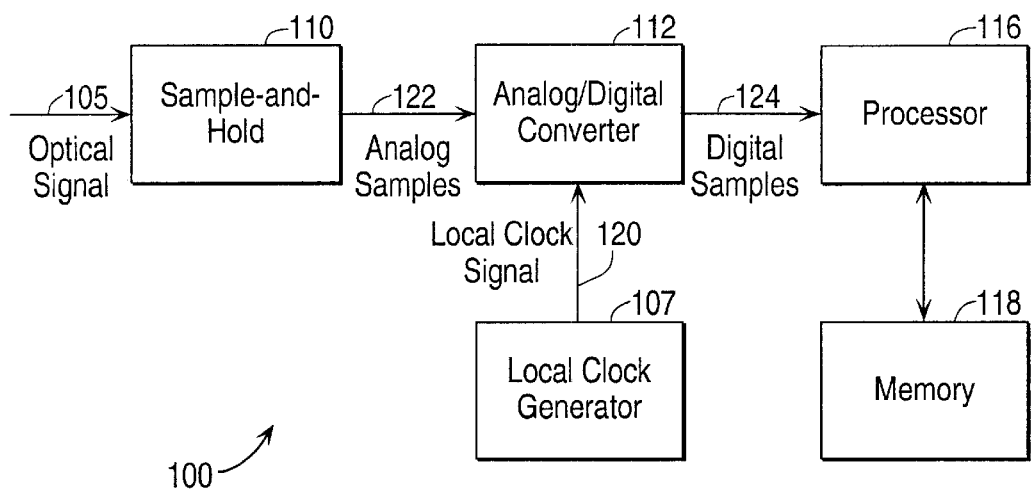
FIG. 1 is a block diagram of an embodiment of the present invention.

FIG. 1 shows an AC performance monitor 100 for monitoring an input signal 105. Input signal 105 is typically an electrical representation of an optical signal whose AC characteristics are to be monitored, and is referred to for convenience as the optical signal 105. The optical signal 105 is normally characterized by a clock rate that characterizes the optical channel bit rate. In a typical scenario, the bit rate will be at or very near one of a number of a priori known bit rates, such as the SONET standards OC-48, OC-192, and OC-768 that correspond to approximately 2.5 GHz (actually 2.488 GHz), approximately 10 GHz, and approximately 40 GHz, respectively.

The performance monitor 100 includes a local clock generator 107, a sample-and-hold circuit 110, an analog-to-digital converter (ADC) 112, a processor 116, and a memory 118. These components are typically implemented by integrated circuits. The performance monitor 100 may be implemented as a circuit board, module or line card as a component of an optical switch or routing device, or the performance monitor 100 may be implemented as a stand-alone device.

The local clock generator 107 generates a local clock signal 120 independently of the optical signal 105. This may be contrasted with the prior art, which uses a clock recovery circuit to recover a clock signal from the optical signal. As will be described in detail below, the performance monitor 100 uses the known local clock rate and samples of the optical signal to determine the bit rate of the optical signal, which can then be used in connection with determining characteristics of the optical signal.

The sample-and-hold circuit 110 provides analog samples 122 of the optical signal 105. It is the only component of the performance monitor 100 that is required to operate at the high frequencies that characterize the optical signal (on the order of 10 gigahertz). The other components of the performance monitor 100 may operate at conventional electronic speeds, which reduces the overall costs of the circuitry. This advantage is even more pronounced when operating at the higher optical speeds (e.g., 40 GHz).

The ADC 112 receives the analog samples 122 and generates digital samples 124 corresponding thereto at a timing determined by the local clock signal 120. The number of samples extracted may vary from a low end determined by the minimum necessary to generate an accurate eye diagram to a high end determined by the quality of the local clock generator 107. It has been determined that 4000 samples are desirable in one embodiment of the present invention.

The local clock rate should be well known and should be harmonically unrelated to the optical signal bit rate, i.e., it should not be an integral multiple or fraction of the optical signal bit rate. In preferred embodiments, the local clock rate is significantly lower than the optical signal bit rate and so the ADC 112 operates to undersample the optical signal 105. Generally, the optical signal 105 has a bit rate of about 10 Gb/s (OC-192). In a particular embodiment, the local clock signal 120 has a frequency (clock rate) of 0.113 GHz, and is thus harmonically unrelated to the optical signal 105. Thus, the ADC 112 samples different points of each bit.

Since the optical signal bit rate is not known with certainty (although it should be close to one of the ITU defined standard data modulation rates, e.g., OC-48, OC-192, or OC-768), there is at least a possibility that the local clock rate will be harmonically related to the optical signal bit rate. In such a case, the optical signal would be having samples taken at the same point in each bit interval, which would render the technique of the invention less useful. If it is determined or somehow known that the local clock rate is harmonically related to the optical signal bit rate, various options may be used so that the ADC 112 does not sample the same point of each bit. One option is to add a phase adjuster circuit. The phase adjuster circuit adjusts the phase of the local clock signal 120 so that the ADC 112 does not sample the same point of each bit. This technique is used in traditional performance monitors that use clock recovery, since in such a case, the sampling rate is guaranteed to be harmonically related to the optical signal clock rate. However, a preferred option is to include a voltage-controlled oscillator (VCO) in the clock generator 107. The VCO is responsive to a VCO control signal that changes the frequency of the local clock signal 120. When the performance monitor 100 detects that the clock signal 120 is harmonically related to the optical signal 105, it adjusts the VCO control signal in a known way to change the frequency of the clock signal 120 so that it is no longer harmonically related to the optical signal.

The processor 116 receives the samples 124 and performs various calculations thereon. The processor 116 interacts with the memory 118 to store the samples 124 and the resulting calculations. The memory 118 may be implemented by any storage technology, including random-access memory (RAM), disk drives, etc. In one embodiment, the processor 116 is a Pentium III processor with a local cache. The samples 124 are clocked into the cache as they are received, and are then moved into the memory 118 for subsequent data processing. In other implementations, the samples could be clocked directly into memory and retrieved by the processor as needed. However, the use of the processor cache is advantageous so long as the processor has a sufficiently large on-chip cache to hold the samples.

For 4000 samples of a 10 GHz signal sampled at 0.113 GHz, the length of one bit in time is 0.1 ns (termed the "bittime"). One sample takes 8.8495575 ns to acquire (termed the "sampletime"). Thus, the total time for 4000 samples is 35,398 ns, or 353,982 bits. The ratio of the time between samples to the length in time of one bit is the sampletime divided by the bittime. This value may be represented by the letter R.

The processor 116 may generate an eye diagram from the samples 124 by determining an x-coordinate value for each sampled value (i.e., having a y-coordinate value y[i]) using the following equation:

$$x[i] = (i*R) \bmod 1$$

where i is the sample number, R is the above-described ratio, and x[i] is the x-coordinate (between zero and one) to be associated with the y-coordinate value y[i]. This data may then be used to determine the frequency (bit rate) of the optical signal 105.

One possible way of determining the bit rate is to perform a Fourier transform on the under-sampled data vector y[i]. The locations of the peaks in the frequency spectrum resulting from this transform, combined with rough beforehand knowledge of the two clock rates, may be used to specify more accurately what the sample time is. However, this is generally problematic in practice. When the undersampled vector x[i] beats slowly with the 10 GHz optical signal 105, peaks can be found, but the accuracy of the exact frequency of the peak needs to be known to better than six digits of accuracy. Such accuracy is generally unavailable with a modest number of samples, such as 4000. The situation becomes even worse when the sampling rate beats rapidly with the optical signal 105.

While other possible solutions include increasing the sample rate and increasing the sample quantity, increasing the sample rate increases the demands on the processing capabilities of the performance monitor. Increasing the sample quantity increases the amount of time needed to acquire a sufficient set of values, increasing the processing demands due to the larger data set, and runs the risk of jitter between the sample rate and the data rate introducing inaccuracies. Another solution is needed.

Figure 2:
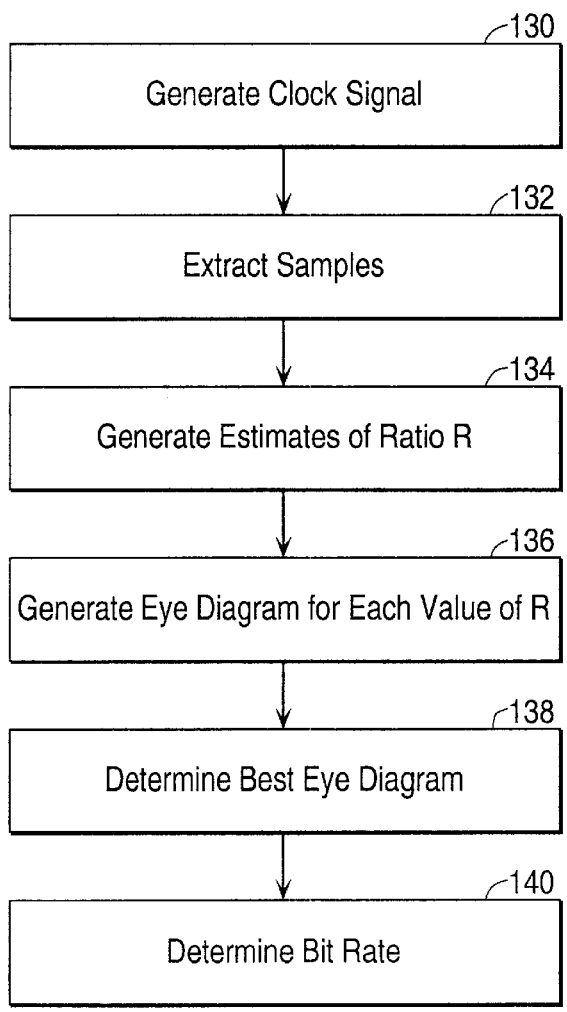
FIG. 2 is a flowchart of a method according to the present invention.

To solve this problem, the performance monitor 100 is able to quickly and accurately determine the bit rate of the optical signal 105 using a manageable sample rate and sample quantity by evaluating numerous eye diagrams generated from estimates of the optical signal bit rate. This process is summarized in FIG. 2.

In a step 130, the clock generator 107 generates the clock signal 120. In a step 132, the ADC 112 extracts the samples 124 from the optical signal 105 at a timing determined by the clock signal 120. In a step 134, the processor 116 generates a number of guesses for the ratio R. The range of estimates for R is narrow due to the reasonably accurate a priori knowledge of the clock rates of the optical signal 105 and the local clock signal 120 that make up the ratio R.

In a step 136, the processor 116 generates an eye diagram using the above equation for calculating x[i] values for each of the sampled y[i] values using each estimate of R. In a step 138, the processor 116 determines which of the eye diagrams is the cleanest. (Step 138 is further detailed below.)

In a step 140, the processor 116 determines the bit rate from the cleanest eye diagram. The cleanest eye will have an estimate of the ratio R that is closest to the actual R. As the clock rate of the local clock signal 120 is known, the bit rate of the optical signal 105 can be determined from the ratio R used to generate the cleanest eye diagram. Note that it is statistically impossible to improve the eye by applying inaccurate timing information, so the resulting waveform represents a worst case for the true signal.

One method that may be used to determine the cleanest eye (step 138) is to use an eye mask technique implemented in software. However, in one embodiment of the present invention, a simpler technique is used. The plot of the eye is divided into a grid, and a count is made of the number of data points in each grid box. For a poor eye, the grid boxes will have roughly equal distributions of points, while for a clean eye some boxes will have many data points and others will have none or very few. By squaring the number of points in each box and adding the results, a single number is obtained that quantifies the cleanness of the eye. This technique works for both noise-free and noisy signals.

This is easily seen by example. Suppose 10,000 points are distributed evenly through 100 grid boxes. The sum of squares gives $100*(100^2)=1,000,000$. If all the points were located in one grid square, and all the others empty, the sum of squares gives $1*(10000^2)=100,000,000$. The cleanest eye will therefore give the largest sum.

Figure 3A:
FIGS. 3A and 3B are graphs of eye diagrams for different estimates of the bit rate.
Figure 3B:
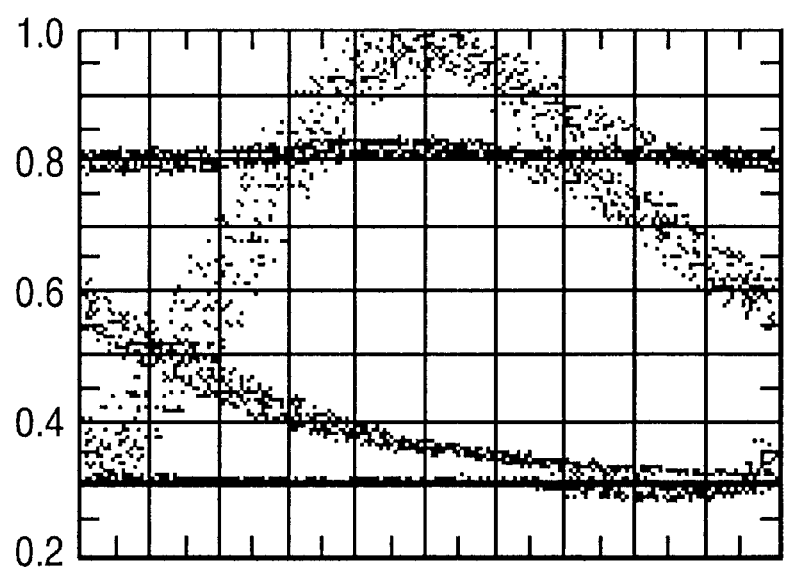

FIGS. 3A and 3B show eye diagrams for two guesses of the ratio R for a situation where the actual value of R was known to be 88.36264028. FIG. 3A shows the cleanest eye, which was found with an estimate of R equal to 88.36264, while FIG. 3B shows a fuzzier eye, which was generated with an estimate of R equal to 88.36267.

The technique can further be enhanced by applying the observation that the data points near the 1 and 0 levels are more or less evenly distributed regardless of whether the eye is clean or not, while points near the middle of the eye are more sensitive. By considering only grid boxes near the middle of the eye, the accuracy of the technique is enhanced.

The processor 116 may perform one or more passes when generating estimates for the ratio R. Initially, a coarse scan with a step size of 1 ppm (i.e., the estimates for R differ by 0.0001) is performed. Then, a finer scan with a step size of 0.1 ppm is performed.

The performance monitor 100 is tolerant to jitter. A simulated jitter was applied to the clock signal 120. For 4000 samples (400,000 bits and 40 microseconds), a jitter of 5 ppm was found to be tolerable. This requirement may be met by most clock generators 107, because on the time scale of 40 microseconds, temperature variation (which is the dominant effect contributing to clock instability) is negligible.

Note that decreasing the sample rate, or increasing the number of samples in the record, will lead to a stricter requirement on relative clock jitter. Fortunately, technology exists today to achieve 100 million samples per second, and 4000 samples are adequate to reconstruct the eye for quality estimates.

Although in an embodiment of the present invention 4000 samples are extracted, similar results may be obtained with as few as 1000 or as many as 5000 samples (including 1500, 2000, 2500, 3000, 3500 or 4500). A very small number of samples (e.g., 200) would not provide enough information to generate a statistically accurate representation of the eye. A relatively large number of samples (e.g., 30,000) is undesirable because jitter will cause the local clock generator 107 to go out of synchronization over that longer period. However, the quantity of samples may be increased beyond 5000 as the quality of the clock generator 107 improves.

If more samples are desired (e.g., for improved accuracy), the processor 116 may perform multiple sample runs and then overlay their data. For example, three runs of 4000 samples can be made. This technique avoids the effects of jitter that could cause the clock generator 107 to get out of synchronization if 12,000 samples were successively extracted. Starting a new run reduces the cumulative jitter.

The performance monitor 100 is able to recognize different data rates than may be expected. For example, if a 2.5 Gb/s signal (OC-48) is expected but a 10 Gb/s signal (OC-192) is present, the eye diagrams generated by the processor 116 will recognizably include four cycles. This will be the case whenever the actual rate is an integer multiple of the expected rate, which is common in many telecommunications applications. The bit rate of the optical signal may then be determined by applying a factor of four to the resultant ratio R.

Although the above text has described various functions related to eye diagrams (e.g., plotting data points, creating eye diagrams, etc.), it is noted that the description has tended more toward an explanation of how a human would perceive the functions performed and not the actual functioning of the device. For example, the performance monitor 100 stores in a memory data values corresponding to the data points in each eye diagram. When the text describes evaluating the eye diagrams, the values need not be actually placed in an eye diagram; the performance monitor 100 performs operations on the stored values that correspond to an eye diagram. When the text describes creating eye diagrams, the performance monitor 100 generates numerical values that correspond to an eye diagram.

Although the above description has focused on specific embodiments, numerous variations and their equivalents are contemplated to be within the scope of the present invention, which is defined by the following claims.

What is claimed is:

1. An apparatus for monitoring an optical signal characterized by a frequency, comprising:
   a clock signal generator coupled to generate a clock signal independently of said optical signal;
   a converter circuit coupled to extract a plurality of samples from said optical signal at a timing determined by said closk signal; and
   a processor coupled to generate a plurality of estimates of a bit rate of said optical signal, to generate a plurality of eye diagrams from said plurality of samples in accordance with said plurality of estimates and a clock rate of said clock signal, to determine a best eye diagram from said plurality of eye diagrams, said processor for generating said eye diagrams according to an equation $$x[i]=(i*R) \bmod 1$$

wherein i is a sample number, x[i] is an x-coordinate mapping of each sample number, and R is a ratio between a time to acquire one sample and a time of one bit of said optical signal.

2. An apparatus for monitoring an optical signal characterized by a frequency, comprising:
   a clock signal generator coupled to generate a clock signal independently of said optical signal;
   a converter circuit coupled to extract a plurality of samples from said optical signal at a timing determined by said clock signal; and
   a processor coupled to generate a plurality of estimates of a bit rate of said optical signal, to generate a plurality of eye diagrams from said plurality of samples in accordance with said plurality of estimates and a clock rate of said clock signal, to determine a best eye diagram from said plurality of eyediagrams, and to determine said bit rate of said optical signal based on said best eye diagram, said processor for determining said best eye diagram by applying a grid to said plurality of eye diagrams, determining a value for each eye diagram by summing a squared quantity of data points in a plurality of boxes of said grid, and selecting one of said plurality of eye diagrams having a highest sum.

3. The apparatus of claim 2, wherein said plurality of boxes comprises a subset of all those in said grid, wherein said subset is in a center of said plurality of eye diagrams.

4. A method of monitoring an optical signal, comprising the acts of:
   generating a clock signal independently of said optical signal; extracting a plurality of samples from said optical signal at a timing determined by said clock signal;
   generating a plurality of estimates of a bit rate of said optical signal;
   generating a plurality of eye diagrams from said plurality of samples in accordance with said plurality of estimates and a clock rate of said clock signal;
   determining a best eye diagram from said plurality of eye diagrams by:
      applying a grid to said plurality of eye diagrams;
      determining a value for each eye diagram by summing a squared quantity of data points in a plurality of boxes of said grid; and
   selecting one of said plurality of eye diagrams having a highest sum; and
   determining said bit rate of said optical signal based on said best eye diagram.

* * * * *